US010753422B2

(12) United States Patent
Raida et al.

(10) Patent No.: US 10,753,422 B2
(45) Date of Patent: Aug. 25, 2020

(54) SWITCHABLE HYDRAULIC MOUNT

(71) Applicant: Sumitomo Riko Company Limited, Aichi (JP)

(72) Inventors: Hans-Joachim Raida, Leichlichen (DE); Waldemar Hermann, Jossgrund (DE); Dimitri Khlistunov, Bad Soden-Salmünster (DE); Holger Ries, Gelnhausen (DE)

(73) Assignee: Sumitomo Riko Company Limited, Aichi (JP)

( * ) Notice: Subject to any disclaimer, the term of this patent is extended or adjusted under 35 U.S.C. 154(b) by 48 days.

(21) Appl. No.: 16/109,990

(22) Filed: Aug. 23, 2018

(65) Prior Publication Data
US 2019/0063543 A1 Feb. 28, 2019

(30) Foreign Application Priority Data
Aug. 24, 2017 (DE) .................. 10 2017 007 999

(51) Int. Cl.
*F16F 13/10* (2006.01)
*B60K 5/12* (2006.01)
*F16F 13/26* (2006.01)

(52) U.S. Cl.
CPC ............ *F16F 13/10* (2013.01); *B60K 5/1208* (2013.01); *B60K 5/1283* (2013.01); *F16F 13/26* (2013.01);
(Continued)

(58) Field of Classification Search
CPC ........ F16F 13/264; F16F 13/26; F16F 13/268; F16F 13/105; F16F 13/106; F16F 13/10;
(Continued)

(56) References Cited

U.S. PATENT DOCUMENTS 5,620,168 A * 4/1997 Ohtake ................... F16F 13/26
267/140.13
5,632,472 A * 5/1997 Kato ....................... F16F 13/10
267/140.13
(Continued)

FOREIGN PATENT DOCUMENTS

DE 4325730 A1 2/1994
DE 102008015370 A1 9/2009
(Continued)

*Primary Examiner* — Robert A. Siconolfi
*Assistant Examiner* — Mahbubur Rashid
(74) *Attorney, Agent, or Firm* — Richard M. Goldberg

(57) ABSTRACT

A switchable hydraulic mount includes a first fluid chamber delimited by a spring body, a second fluid chamber fluidically connected to the first fluid chamber, a decoupling element for decoupling the chambers, and arranged between the first fluid chamber and a decoupling chamber, the chambers being fluidically separated from one another, and a switchable valve to selectively open or close the decoupling chamber with respect to the environment, the switchable valve including a valve housing with a linear actuator including an actuator head displaceable in the valve housing between closed and open positions, the valve housing including at least one valve opening which, in the open position, connects the decoupling chamber to the environment and which, in the closed position, is closed by the actuator head, and the valve opening including at least a component of extension transverse with respect to the movement axis of the actuator head.

11 Claims, 5 Drawing Sheets

(52) U.S. Cl.
CPC ..... *F16F 2228/066* (2013.01); *F16F 2230/30* (2013.01)

(58) Field of Classification Search
CPC ................. F16F 2230/30; F16F 15/005; F16F 2230/183; F16F 9/04; B60K 5/1283; B60K 5/1208
See application file for complete search history.

(56) References Cited

U.S. PATENT DOCUMENTS

| | | | | |
|---|---|---|---|---|
| 5,839,720 A * | 11/1998 | Kojima | .................... | F16F 13/26 267/140.14 |
| 5,992,833 A * | 11/1999 | Tanahashi | ............. | F16F 13/264 267/140.13 |
| 6,082,718 A * | 7/2000 | Yamada | ................ | F16F 13/105 180/300 |
| 6,206,351 B1 * | 3/2001 | Hamada | .................. | F16F 13/20 267/140.13 |
| 6,364,294 B1 * | 4/2002 | Gennesseaux | ......... | F16F 13/264 267/140.13 |
| 7,036,804 B2 * | 5/2006 | Bodie | ...................... | F16F 13/20 267/140.14 |
| 7,448,605 B2 * | 11/2008 | Bretaudeau | ........... | F16F 13/268 267/140.14 |
| 8,157,250 B2 * | 4/2012 | Lee | ......................... | F16F 13/26 267/140.14 |
| 8,444,124 B2 * | 5/2013 | Fueki | ...................... | F16F 13/26 267/140.14 |
| 9,366,309 B2 * | 6/2016 | Marienfeld | ............. | F16F 13/10 |
| 2014/0145383 A1 * | 5/2014 | Yasuda | ................. | F16F 13/268 267/140.13 |
| 2015/0233443 A1 * | 8/2015 | Lemaire | ................ | F16F 13/268 267/140.14 |
| 2016/0273609 A1 * | 9/2016 | McDonough | ........... | F16F 13/26 |

FOREIGN PATENT DOCUMENTS

| | | |
|---|---|---|
| DE | 102014224244 A1 | 6/2016 |
| EP | 1443240 A1 | 8/2004 |
| WO | 0163138 A1 | 8/2001 |

\* cited by examiner

SWITCHABLE HYDRAULIC MOUNT

BACKGROUND OF THE INVENTION

The present invention relates to a switchable hydraulic mount.

From the prior art, switchable hydraulic mounts, also referred to as hydrobearings, are known, in which the decoupling action of a decoupling membrane can be varied by closing an opening of a decoupling chamber by means of a linear actuator. The decoupling membrane is arranged between the fluid-filled work chamber and the air-filled decoupling chamber and fluidically separates these chambers. When the opening is closed, the air volume enclosed in the decoupling chamber acts as an air spring. The spring stiffness depends on the size of the decoupling membrane and on the volume of the decoupling chamber among other factors. When the opening of the decoupling chamber is closed, the spring stiffness of the enclosed air volume is high, i.e., during the deflection of the decoupling membrane, the spring stiffness of the enclosed volume counteracts the deflection. Conversely, by opening the decoupling chamber, the spring stiffness is reduced, since the decoupling chamber then does not represent a closed-off, fluid-tight volume but is instead connected via channels to other large volumes or to the environment, and, when the membrane is deflected, a fluid exchange occurs. As a consequence, the spring stiffness decreases significantly under the membrane, and thus the transfer of vibrations also decreases at certain excitation frequencies and excitation amplitudes (decoupling).

Another consequence of the decoupling is that the work chamber is decoupled from the collection chamber, that is to say substantially no fluid exchange occurs between the work chamber and the collection chamber via the damping channel, and thus no hydraulic damping occurs either. When the decoupling chamber is opened, the hydraulic mount therefore exhibits a low stiffness and a low hydraulic damping for certain excitation frequencies and excitation amplitudes.

On the other hand, when the opening of the decoupling chamber is closed by means of the linear actuator, air can no longer escape from the decoupling chamber into the environment, so that the possible deflection of the decoupling membrane is reduced due to the spring stiffness of the air in the decoupling chamber. Depending on the deflection of the decoupling membrane, a high pressure or low pressure which is opposite to the deflection is generated. Thereby, the decoupling action of the decoupling membrane is reduced, and, at the specified excitation frequencies and excitation amplitudes, the work fluid flows back and forth substantially between the work chamber and the collection chamber via the damping channel, so that, when the decoupling chamber is closed, the hydraulic mount exhibits a high stiffness and a high damping. Thus, in engine mounts, the stiffness and damping behavior, for example, can be varied in a targeted manner in a standing, idling vehicle by switching the linear actuator. Above-described switchable hydraulic mounts are disclosed in EP 1 443 240 A1 or WO 01/63138 A1, for example.

However, in the conventional switchable hydraulic mounts, the problem is that high actuation forces of the linear actuator are necessary for the closing of the opening of the decoupling chamber, in order to close or keep closed the decoupling chamber against the pressures applied. Due to the high actuation forces, large and expensive linear actuators are used for the switchable hydraulic mounts. Furthermore, in conventional switchable hydraulic mounts, the opening and closing noises due to these high actuation forces can also be quite considerable and disturbing.

SUMMARY OF THE INVENTION

Therefore, the aim of the present invention is to provide a switchable hydraulic mount which requires low actuation forces of the linear actuator and which thus enables the use of smaller, more economical linear actuators and which generates minor closing noise.

This aim is achieved by the subject matter of the independent claim. Preferred embodiments result from the dependent claims.

According to an aspect of the present invention, a switchable hydraulic mount is provided, comprising: (i) a first fluid chamber which is delimited partially by a spring body, (ii) a second fluid chamber which is fluidically connected via at least one fluid channel to the first fluid chamber, so that, during compression and rebound of the spring body, a damping fluid can flow between the first fluid chamber and the second fluid chamber, (iii) a decoupling element for decoupling the first and the second fluid chamber, wherein the decoupling element is arranged between the first fluid chamber and a decoupling chamber, fluidically separating said chambers from one another, and (iv) a switchable valve which can selectively open or close the decoupling chamber with respect to the environment (or channels that are in connection with the environment), in order to vary a decoupling action of the decoupling element, wherein the switchable valve comprises a valve housing with a linear actuator arranged therein, wherein the linear actuator comprises an actuator head which can be displaced in the valve housing between a closed position and an open position, wherein the valve housing comprises at least one valve opening which, in the open position, connects the decoupling chamber to the environment and which, in the closed connection, is closed by the actuator head, wherein the valve opening comprises at least in sections a component of extension transverse to the movement axis of the actuator head.

Advantageously, the inventive configuration of the switchable hydraulic mount enables a closing of the valve opening with low actuation force of the linear actuator, since at least one component of the flow direction of the oscillating air stream extends at least in sections from the decoupling chamber through the valve opening transversely with respect to the movement axis of the actuator head of the linear actuator. Thus, the linear actuator does not have to work entirely against the low or high pressures of the flow, which are generated in particular during the opening and the closing. This enables the use of smaller, more economical linear actuators and reduces the closing and opening noises.

The switchable hydraulic mount can be, for example, an engine mount or an undercarriage mount or subframe mount. The first and the second fluid chamber and the fluid channel of the hydraulic mount are filled or can be filled with a damping fluid. The first fluid chamber is delimited partially by the spring body, i.e., in that the first fluid chamber can be formed partially in the spring body. The first fluid chamber can also be referred to as work chamber. The spring body can comprise elastomer material and can be formed substantially in the shape of a cone in cross section through the longitudinal axis of the hydraulic mount. The spring body can comprise an installation connection for a connection to a device to be damped, for example, an engine. The installation connection can be formed along the longitudinal axis of the hydraulic mount. Between the first fluid chamber and the second fluid chamber, a separation plate or channel disk can be arranged, in order to delimit said fluid chambers. The fluid channel, which can also be referred to as damping channel, is preferably arranged in the separation plate. The switchable valve can be arranged on the separation plate, preferably on the side of the second fluid chamber. The second fluid chamber, which can also be referred to as collection chamber, is preferably delimited partially by an elastomer bellows. The hydraulic mount can be designed to be substantially axially symmetrical.

The decoupling chamber and the decoupling element can be arranged or formed in the separation plate. The decoupling element can be formed as an elastomer decoupling membrane which is inserted in the separation plate and delimits the decoupling chamber with respect to the first fluid chamber. The decoupling chamber can comprise a ventilation channel which can be formed in the separation plate. The switchable valve can be arranged in the hydraulic mount, so that the ventilation channel is fluidically connected to the valve opening, but is otherwise sealed by the valve housing with respect to the environment.

During the compression of the spring body, due to a loading of the hydraulic mount, the volume of the first fluid chamber is decreased, whereby the pressure of the damping fluid in the interior of the first fluid chamber is increased. Thereby, the decoupling element is elastically deformed into the decoupling chamber, and at the same time the damping fluid flows at least partially from the first fluid chamber via the fluid channel into the second fluid chamber. During the rebound of the spring body, when there is no load on the hydraulic mount, the decoupling element is elastically returned or deformed into the first fluid chamber, and the damping fluid flows from the second fluid chamber back into the first fluid chamber.

The deforming of the decoupling element is strongly dependent on the speed of the spring compression and rebound or on the frequency and amplitude of the spring compression and rebound, since, over time, a pressure compensation between the first and the second fluid chamber occurs. The frequency and the amplitude of the spring compression and rebound can also be referred to as excitation frequency and excitation amplitude.

Furthermore, the deformation of the decoupling element is also strongly dependent on the pressure predominating in the decoupling chamber. When the substantially constant environmental pressure predominates, whereas, when the decoupling chamber is closed as a result of the volume change of the decoupling chamber, the pressure is variable due to the deformation of the decoupling element, and in particular a high counter pressure is generated therein during spring compression.

The switchable hydraulic mount is preferably configured so that, at predetermined or predeterminable excitation frequencies and/or excitation amplitudes, the first fluid chamber is decoupled from the second fluid chamber, that is to say substantially no fluid exchange occurs between the first fluid chamber and the second fluid chamber via the fluid channel. At these excitation frequencies and/or excitation amplitudes, the volume change of the first fluid chamber is then taken up substantially completely by the deformation of the decoupling element. When the decoupling chamber is open, the decoupling element thus has a high decoupling action, which means that, when the decoupling chamber is opened, for these certain excitation frequencies and excitation amplitudes, the hydraulic mount exhibits a low stiffness and a low damping. At higher frequencies, i.e., at frequencies much higher than the resonance frequency of the oscillation or vibration of the fluid in the fluid channel, due to the mass inertia of the fluid, no significant fluid exchange occurs between the first and the second fluid chamber. The result of this is that, even in this frequency range, the stiffness can decrease or increase significantly due to the opening and closing of the decoupling chamber. The hydraulic mount can be configured so that it exhibits a high decoupling action of the decoupling element at excitation frequencies and/or excitation amplitudes that occur usually during idling and also in any other vehicle operating state in which a low mount stiffness is desired.

On the other hand, when the opening or the ventilation channel of the coupling chamber is closed by means of the switchable valve, air can no longer escape from the decoupling chamber into the environment, so that the decoupling element is substantially prevented from being deflected or moving by the high pressure or low pressure of the air in the decoupling chamber, which develops when said decoupling element is deflected. Thereby, the decoupling action of the decoupling membrane is reduced, and at certain excitation frequencies and excitation amplitudes the damping fluid flows back and forth substantially between the first fluid chamber and the second fluid chamber via the fluid channel, so that, when the decoupling chamber is closed, the hydraulic mount exhibits a high stiffness and a high damping.

The linear actuator for the closing or opening of the valve opening can include a drive such as, for example, an electromagnetic actuator which can also be arranged in the valve housing. The valve housing furthermore comprises an actuator head accommodation, in which the actuator head can be moved back and forth between the closed position and the open position along the movement axis. The movement axis or longitudinal axis of the actuator head can extend substantially along the longitudinal axis or symmetry axis of the hydraulic mount. The actuator head accommodation has an internal contour which corresponds at least in sections to the outer contour of the actuator head. The actuator head can be designed to be substantially cylindrical at least in sections, but it is not limited to such a shape.

The extension direction of the valve opening can comprise at least in sections a component transverse to the movement axis of the actuator head. The valve opening can extend through a side wall of the actuator head accommodation of the valve housing at least in sections substantially transversely or also at a slant with respect to the movement axis of the actuator head. In other words, the radial side wall of the actuator accommodation or of the valve housing can comprise a recess which forms the valve opening. The valve opening is arranged between the actuator head and the decoupling chamber, in particular between the actuator head and the ventilation channel of the decoupling chamber. In other words, the valve opening is fluidically connected to the decoupling chamber or to the ventilation channel both in the open position and also in the closed position of the actuator head. The shape of the valve opening is not limited. In the simplest case, the valve opening can be a straight cylindrical bore or a straight channel. The valve opening can also be a larger recess in the valve housing, as long as said opening can be closed by the actuator head and as long as at least one component of the flow direction of the oscillating air extends at least in sections through the valve opening in the open position substantially transversely with respect to the movement axis of the actuator head. One can also say that the valve opening has a radial extension component with regard to the actuator head or the valve housing. The extension direction of the valve opening can enclose an angle of approximately 45° to approximately 90°, preferably approximately 60° to approximately 90° with respect to the movement axis of the actuator head. The valve housing can comprise 2, 3, 4, 5, 6 or more valve openings. All the valve openings can be closed by displacing the actuator head into the closed position or opened by displacing the actuator head into the open position.

In the open position, the valve opening is open, and the decoupling chamber is connected to the environment so that environmental pressure substantially predominates in the decoupling chamber. The valve housing and/or the actuator head can then comprise passages and/or gaps which connect the valve opening in the open position to the environment.

If the actuator head is switched by the linear actuator into the closed position, the actuator head moves in front of the valve opening and closes said valve opening, so that no air can escape from the decoupling chamber into the environment. It should be noted that the hydraulic mount can also be configured so that the actuator head can be positioned in an intermediate position between the closed position and the open position, in order to adjust the decoupling action of the decoupling element.

The valve housing can be formed from metal or from plastic, preferably from plastic. The actuator head can be formed from metal or plastic, preferably from metal. Plastic also includes elastomers.

Preferably, the valve opening extends at least in sections substantially transversely with respect to the movement axis of the actuator head.

Preferably, the actuator head internally has a cavity which is connected to the environment, at least in the open position. An axial end face of the actuator head comprises an actuator head opening of the cavity, and a circumferential marginal section thereof forms an actuator head sealing surface which, in the closed position, is in contact with an inner sealing surface of the valve housing.

Advantageously, the total area of the actuator head sealing surface, against which a pressure of the decoupling chamber can be applied when the valve is closed, is considerably decreased due to the actuator opening in the axial end face of the actuator head. Thus, the necessary actuation force of the linear actuator for closing the valve can be decreased significantly, so that smaller, more economical linear actuators can be used, and the closing noises can be reduced further. Also advantageously, the stroke of the actuator head between the closed position and the opening position can be adjusted to be smaller, since the circumference of the annular actuator head sealing surface can be selected to be large, and thereby just a small gap between the actuator head sealing surface and the inner sealing surface of the valve housing is sufficient in order to connect the decoupling chamber substantially without loss to the environment. Thereby, an even smaller and more economical linear actuator can be used. Furthermore, due to the small stroke, the closing and opening noises of the valve can also be reduced, since due to the smaller acceleration path only a small amount of kinetic energy can build up during the closing or opening.

For example, the cavity can be a cylindrical bore which extends from an axial end of the actuator head along its movement axis or longitudinal axis. The cavity can be constantly connected to the environment, that is to say it can be open towards the environment. Alternatively, the cavity can comprise a lateral actuator head ventilation passage which, only in the open position, is connected to or superposed by a valve housing ventilation passage of the valve housing, in order to connect the cavity to the environment. The actuator head opening is understood to mean the actuator head-side opening of the cavity. In the open state of the decoupling chamber, air oscillates through the cavity in the actuator head. This configuration is fundamentally different from the systems with linear actuators of the prior art, in which the flows flow outside past the actuator head in the open state.

The axial end face can be arranged on a front end of the actuator head in closing direction, said end facing the decoupling chamber or the ventilation channel. The axial end face as well as the actuator head sealing surface extend preferably substantially transversely with respect to the movement axis of the actuator head. In the open position, the radial opening area of the annular actuator head sealing surface is preferably approximately the same as the area of the actuator head opening transverse to the movement axis. However, the opening area of the actuator head sealing surface can also differ, for example, by approximately 20% from the area of the actuator head opening transverse to the movement axis. Thus, the opening area of the actuator head sealing surface can be approximately 80% to approximately 120% of the area of the actuator head opening. The stroke of the actuator head can be approximately 0.5 mm to approximately 3 mm.

The inner sealing surface of the valve housing which faces the actuator head sealing surface can be arranged internally on a front end of the valve housing, in particular of the actuator head accommodation thereof, in closing direction of the actuator head. In other words, the inner sealing surface of the valve housing represents the axial inner wall of the actuator head accommodation or a section thereof. The inner sealing surface of the valve housing extends preferably substantially transversely with respect to the movement axis of the actuator head. Preferably, the valve opening is arranged substantially at a height in the valve housing which corresponds to the height of the inner sealing surface of the valve housing. Particularly preferably, the valve opening adjoins the inner sealing surface of the valve housing. In the closed position, the actuator head sealing surface is in sealing contact with the inner sealing surface of the valve housing and thus seals the valve opening with respect to the cavity.

Preferably, the switchable valve moreover comprises an auxiliary seal which at least in the closed position seals a gap between a radial outer wall of the actuator head and a radial inner wall of the valve housing with respect to the environment.

Advantageously, the auxiliary seal ensures that in the closed position no air from the decoupling chamber reaches the environment via the valve opening or through a gap between the radial outer wall of the actuator head and the radial inner wall of the valve housing. This enables the provision of a loose fit, i.e., a fit with play, between actuator head and valve housing, in particular the actuator head accommodation thereof, whereby the production is simplified and the actuation force for displacing the actuator head can be reduced even further.

The auxiliary seal is preferably formed circumferentially, in particular annularly, and it is preferably formed between the valve housing and the actuator head. In view of the closing direction, the auxiliary seal is moreover preferably set back with respect to the actuator head sealing surface or with respect to the inner sealing surface in such a manner that that the valve opening is arranged in an area of the valve housing between the actuator head sealing surface and the auxiliary seal or between the inner sealing surface and the auxiliary seal.

Preferably, the auxiliary seal comprises an actuator head auxiliary sealing surface which is formed as radially protruding and circumferentially on the actuator head, and an inner auxiliary sealing surface which is formed in the valve housing, wherein the actuator head auxiliary sealing surface is arranged set back with respect to the actuator head sealing surface, and the inner auxiliary sealing surface is arranged set back with respect to the inner sealing surface, and wherein in the closed position the actuator head auxiliary sealing surface is in contact with the inner auxiliary sealing surface.

Advantageously, by means of the above configuration, the auxiliary seal can be implemented in a simple manner, whereby the costs for the switchable valve can be reduced further.

The actuator head auxiliary sealing surface is formed on the actuator head and can represent an axial end face of a section of increased diameter of the actuator head. The actuator head auxiliary sealing surface is preferably formed substantially parallel to the actuator sealing surface. In view of the closing direction of the actuator head, the actuator head auxiliary sealing surface is set back with respect to the actuator head sealing surface in such a manner that the valve opening is arranged in an area of the valve housing between actuator head sealing surface and actuator head auxiliary sealing surface.

The inner auxiliary sealing surface is formed on the valve housing and can represent an inner axial end face of a section of increased diameter of the valve housing, in particular of the actuator head accommodation thereof. The inner auxiliary sealing surface is preferably formed substantially parallel to the inner sealing surface of the valve housing. In view of the closing direction of the actuator head, the inner auxiliary sealing surface is set back with respect to the inner sealing surface in such a manner that the axial distance between the inner auxiliary sealing surface and the inner sealing surface corresponds approximately to the axial distance between the actuator head auxiliary sealing surface and the actuator head sealing surface. In the closed position, the actuator head auxiliary sealing surface is in sealing contact with the inner auxiliary sealing surface and preferably forms a circumferential or annular auxiliary seal. The valve opening is arranged in an area of the valve housing between the inner sealing surface and the inner auxiliary sealing surface, so that, due to the two spaced apart seals formed in the closed position, a reliable sealing of the valve opening or of the decoupling chamber can be ensured.

Preferably, the auxiliary seal comprises a sealing membrane which is connected both to the valve housing and also to the actuator head and which extends at least in sections in radial direction from the actuator head to the valve housing.

Advantageously, the auxiliary seal which is formed as a sealing membrane ensures a reliable sealing off, since no sealing surfaces have to be pressed together in the closed position, instead the sealing action occurs in any position of the actuator head.

The sealing membrane can be formed from elastomer material and it can be vulcanized or glued at least partially along the circumference of the actuator head to said actuator head. The sealing membrane can be vulcanized or glued at least partially along the radial inner surface of the valve housing, in particular of the actuator head accommodation thereof, to said radial inner surface. The sealing membrane can circumferentially bridge a spacing between the outer surface of the actuator head and the inner surface of the valve housing, in order thus to ensure the sealing. The sealing membrane is configured with regard to the shape and/or the elasticity in such a manner that a movement of the actuator head between the open position and the closed position is enabled.

Preferably, a connection area of the sealing membrane with respect to the actuator head is formed as bellows-shaped.

Advantageously, the bellows-shaped design of the sealing membrane in the connection area enables a displacement of the actuator head between the open position and the closed position substantially without elastic stretching or buckling of the sealing membrane, whereby the actuation forces of the linear actuator can be lowered and the useful life of the sealing membrane can be increased.

The sealing membrane with the bellows-shaped section can also be referred to as a rolling membrane. The actuator head can comprise an annular depression which extends along the radial outer circumference of the actuator head and into which the bellows-shaped section of the sealing membrane protrudes at least in the closed position. Preferably, in the closed position, the bellows-shaped section of the sealing membrane is in contact substantially completely with the surface of the annular depression, wherein, in the case of a displacement of the actuator head into the open position, the bellows-shaped section is lifted at least partially from the surface of the annular depression. The bellows-shaped section can be vulcanized or glued partially in the annular depression to the actuator head.

Preferably, the valve housing is formed in multiple parts, and the sealing membrane is inserted between valve housing portions, in order to connect the sealing membrane to the valve housing.

Due to the design in multiple parts, in particular in two parts, the installation process of the switchable valve can be simplified, whereby, due to the insertion or clamping of the sealing membrane between two or more valve housing portions, a reliable sealing connection with the valve housing can be ensured. The valve housing portions can be glued, welded or screwed to one another. The sealing membrane can comprise a circumferential bead, by means of which it is held between the valve housing portions which comprise corresponding grooves.

Preferably, the actuator head sealing surface and/or the inner sealing surface of the valve housing comprises elastomer sealing material.

The actuator head auxiliary sealing surface and/or the inner auxiliary sealing surface can also comprise elastomer sealing material. Due to the elastomer sealing material, the sealing action can be improved. Preferably, the elastomer sealing material of the actuator head sealing surface and the elastomer sealing material of the actuator head auxiliary sealing surface are formed integrally or as a single piece, and/or the elastomer sealing material of the inner sealing surface and the elastomer sealing material of the inner auxiliary sealing surface are formed integrally or as a single piece. The elastomer sealing material of the actuator head sealing surface and the elastomer sealing membrane can also be formed integrally or as a single piece. Due to the integral or single-piece design, the production can be simplified. The elastomer sealing material is preferably vulcanized to the actuator head or to the valve housing, but it can also be glued thereto.

Preferably, the sealing material of the actuator head sealing surface comprises an axially protruding, circumferential sealing lip, and the inner sealing surface of the valve housing comprises a circumferential sealing groove in which the sealing lip of the actuator head engages in the closed position, and/or the sealing material of the inner sealing surface of the valve housing comprises an axially protruding, circumferential sealing lip, and the actuator head sealing surface comprises a circumferential sealing groove in which the sealing lip of the valve housing engages in the closed position.

Due to the sealing lip and sealing groove combination, the sealing action of the sealing material can be improved further. Preferably, sealing lip and sealing groove are configured so that, in the closed position, the sealing lip is pressed by the applied pressure against the inner surface of the sealing groove, whereby the sealing action is strengthened.

The sealing lip or the sealing groove of the actuator head can be formed along an outer marginal area of the actuator head sealing surface. The actuator head auxiliary sealing surface and the inner auxiliary sealing surface can also in each case comprise a sealing lip and/or a sealing groove, which engage in one another in closed position.

Preferably, the sealing material of the actuator head sealing surface comprises a circumferential, radially protruding sealing flange which, in the closed position, is in contact with the inner sealing surface of the valve housing.

Preferably, the switchable valve can be switched electrically. In particular, the switchable valve is a switchable magnetic valve.

The present invention also relates to the above-described switchable valve without the rest of the components of the switchable hydraulic mount.

BRIEF DESCRIPTION OF THE DRAWINGS

Below, embodiments of the present invention are described in greater detail in reference to the appended figures. It is understood that the present invention is not limited to these embodiments, and that individual features of the embodiments can be combined freely to form other embodiments.

The Figures Show.

DETAILED DESCRIPTION

Figure 1:
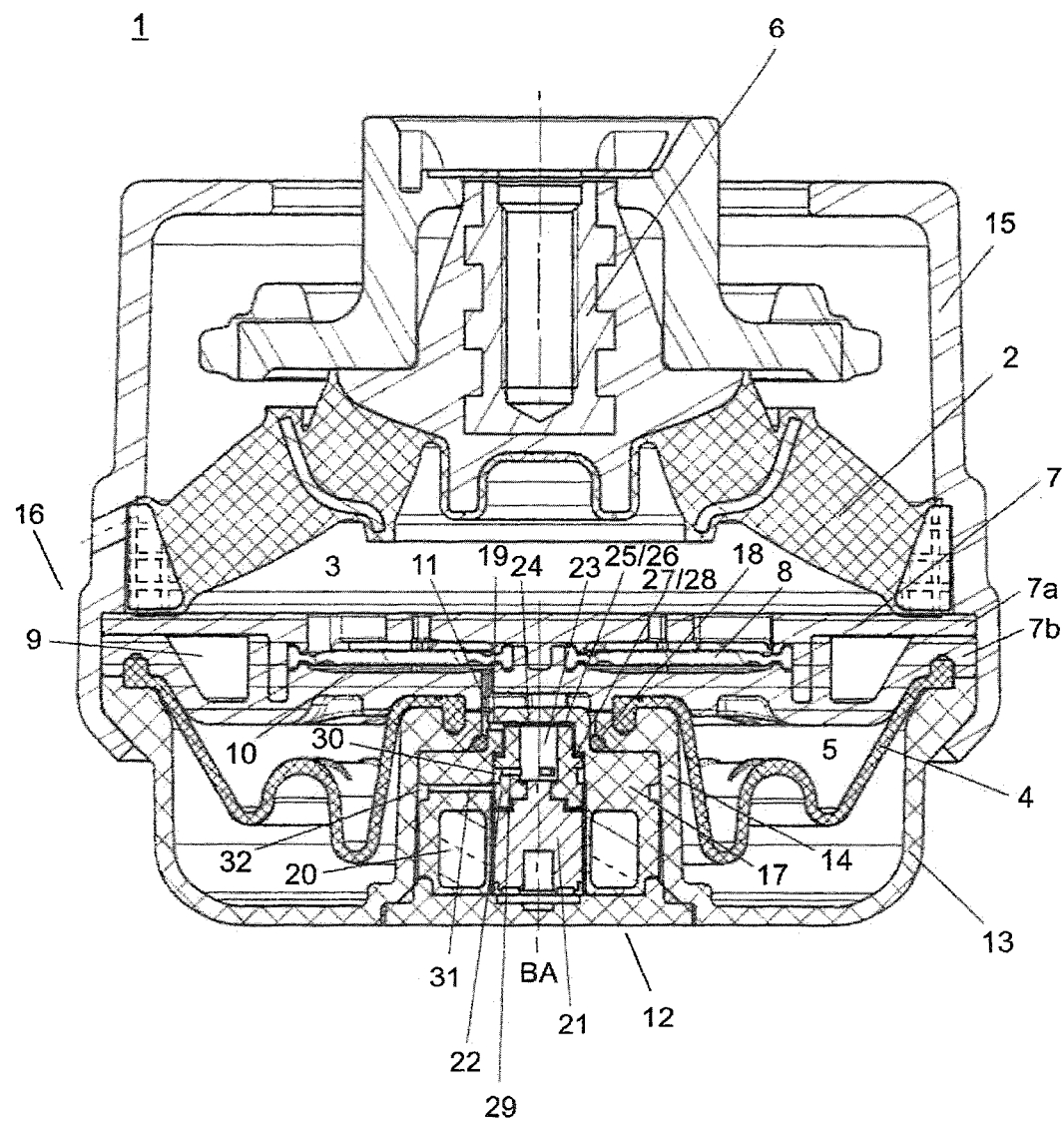
FIG. 1 a cross-sectional representation of a switchable hydraulic mount according to a first embodiment.

FIG. 1 shows a cross-sectional representation of a hydraulic mount 1 according to a first embodiment, wherein the cross section extends through the central axis of the hydraulic mount 1. The hydraulic mount 1 comprises a spring body 2 made of elastomer material, which partially delimits a first fluid chamber 3 formed therein, and an elastomer bellows 4 which partially delimits a second fluid chamber 5 formed therein. The spring body 2 is designed substantially as plate-shaped or conical and comprises, at its top, an installation connection 6 with a threaded bore. Via the installation connection 6, the hydraulic mount 1 can be connected, for example, to an engine.

The second fluid chamber 5 is arranged under the first fluid chamber 3, wherein, between the first fluid chamber 3 and the second fluid chamber 5, a separation plate 7 is arranged, which delimits said chambers. It should be noted that, in the present application, direction indications such as "above" or "below" should be understood with a view to a hydraulic mount in installation position, that is to say when the installation connection 6 is arranged above, and the longitudinal axis of the threaded bore extends vertically.

The separation plate 7, which can also be referred to as channel disk, comprises two plate portions 7a, 7b, between which a disk-shaped decoupling membrane 8 as decoupling element is inserted. In the separation plate 7, a fluid channel 9 is formed moreover, which fluidically connects the first fluid chamber 3 and the second fluid chamber 5. The fluid channel 9 extends within the separation plate 7 at least in sections along an outer marginal area of the separation plate 7, in order to generate a damping by means of the oscillating damping fluid during the operation of the hydraulic mount 1.

The separation plate 7 moreover comprises an annular decoupling chamber 10 which is formed under the decoupling membrane 8, and which is delimited at the top by the decoupling membrane 8. A ventilation channel 11 extends from the decoupling chamber 10 downward, wherein the ventilation channel 11 is closed by the switchable valve 12 in the form of a magnetic valve in the installed state.

The hydraulic mount 1 moreover comprises a lower mount housing 13. The lower mount housing 13 comprises, in the center, a valve accommodation 14 in which the switchable valve 12 is accommodated or arranged so that the movement axis BA of the valve 12 coincides with the longitudinal axis of the threaded bore of the installation connection 6 and also with the central axis of the hydraulic mount 1. The valve 12 is formed substantially cylindrically. An outer marginal section of the bellows 4 is firmly clamped between the separation plate 7 and an outer marginal section of the lower mount housing 13, and an inner marginal section of the bellows 4 is clamped between the separation plate 7 and an inner marginal section of the valve accommodation 14 of the lower mount housing 13.

The hydraulic mount 1 moreover comprises an upper mount housing 15 which comprises a flanging 16 which clamps an outer marginal section of the spring body 2, an outer marginal section of the two plate portions 7a, 7b, the outer marginal section of the bellows 4, and the outer marginal section of the lower mount housing 13 to one another, and thus fastens these components. The lower mount housing 13 and the upper mount housing 15 can be pressed into an installation structure, in order to connect the hydraulic mount 1, for example, to a vehicle frame. The valve 12 can be pressed or glued in the valve accommodation 14; however, said valve can also be fastened, as the hydraulic mount 1 is pressed into the installation structure, by said installation structure.

In the center in the valve accommodation 14, the lower mount housing 13 comprises a recess through which an axially protruding, cylindrical central section of reduced diameter of the valve housing 17 of the valve 12 extends. The valve housing 17 is sealed with respect to the lower mount housing 13 by means of an O-ring 18. The ventilation channel 11 of the decoupling chamber 10 is closed by the valve housing 17; however, a valve opening 19 of the valve housing 17 is fluidically connected to the ventilation channel 11.

The valve housing 17 comprises a linear actuator arranged therein, comprising a drive coil 20, an armature 21, and an actuator head 22. The actuator head 22 is arranged coaxially with respect to the armature 21 and firmly connected at its axial end, which is the back end in closing direction, to the armature 21. Actuator head 22 and armature 21 can be moved back and forth in an actuator head accommodation of the valve housing 17 along the movement axis BA between a closed position and an open position. FIG. 1 shows the closed position, in which the valve opening 19 is fluidically closed by the actuator head 22. The valve opening 19 extends straight through the valve housing 17 in the area of the axially protruding section of reduced diameter in a direction substantially transverse with respect to the movement axis of the valve or of the actuator head 22.

The actuator head 22 and the armature 21 are formed substantially cylindrically. In addition, the actuator head 22 is formed to be hollow and comprises a cylindrical cavity 23 formed therein. The axial end face of the actuator head 22, which is the front end in closing direction, comprises an actuator head opening 24 of the cavity 23. Around the actuator opening 24, on the actuator head 22, a circumferential actuator head sealing surface 25 is formed, which comprises circumferential elastomer sealing material 26 arranged thereon. The actuator head 22 moreover comprises a section of increased diameter in comparison to the diameter of the front axial end section of the actuator head 22. The transition from the front axial end section to the section of increased diameter is stepped or comprises a step, wherein the axial end face of the step forms a circumferential actuator head auxiliary sealing surface 27 which comprises the circumferential elastomer sealing material 28 arranged thereon.

In the closed position shown in FIG. 1, the actuator head sealing surface 25 is in fluid-tight contact with the inner surface of the valve housing 17 or with the inner surface of the actuator head accommodation thereof. At the same time, in the closed position, the actuator head auxiliary sealing surface 27 is also in fluid-tight contact with the inner surface of the valve housing 17 or with the inner surface of the actuator head accommodation thereof, in order to form an auxiliary seal. For this purpose, the inner contour of the valve housing 17 or of the actuator head accommodation is formed so that it corresponds to the outer contour of the actuator head 22. The sections of the inner surface of the valve housing 17, with which the actuator head sealing surface 25 and the actuator head auxiliary sealing surface 27 are in contact, can be referred to as inner sealing surface and as inner auxiliary sealing surface of the valve housing 17 respectively. In the closed position, by means of the actuator head sealing surface 25, air from the decoupling chamber 10 is prevented from reaching the environment via the ventilation channel 11, the valve opening 19, and the cavity 23. By means of the auxiliary seal or the actuator head auxiliary sealing surface 27, air from the decoupling chamber 10 is prevented from reaching the environment via the ventilation channel 11, the valve opening 19, and an interstice or gap between the inner surface of the valve housing 17 and the outer surface of the actuator head 22. Thus, it is ensured that the valve opening 19 is closed in a fluid-tight manner with respect to the environment.

The actuator head 22 comprises at least one actuator head ventilation passage 29 which extends under the actuator head auxiliary sealing surface 27 laterally from the cavity 23 through the actuator head 22. In the closed position, the actuator head ventilation passage 29 is closed with respect to the environment by the inner surface of the valve housing 17, and at least in the open position, the actuator head ventilation passage 29 is open with respect to the environment. The actuator head 22 comprises a circumferential actuator head ventilation groove 30 which extends along the radial outer circumference of the actuator head 22 and leads into the at least one actuator head ventilation passage 29 coming from the cavity 23. The actuator head ventilation channel 30 is closed in the closed position radially outwardly by the inner surface of the ventilation valve housing 17.

The valve housing 17 comprises at least one valve housing ventilation passage 31 which extends under the actuator head ventilation channel 30 in the closed position laterally from the actuator head accommodation through the valve housing 17. However, at least in the open position, the valve housing ventilation passage 31 is fluidically connected to the actuator head ventilation channel 30 and the actuator head ventilation passage 29. The valve housing ventilation passage 31 is fluidically connected to the environment. The valve housing 17 comprises a circumferential valve housing ventilation channel 32 which extends along the radial outer circumference of the valve housing and leads into the at least one valve housing ventilation passage 31 coming from the actuator head accommodation. In the installed state, the valve housing ventilation channel 32 is in fact covered radially outwardly by the wall of the valve accommodation 14, but is not closed in a fluid-tight manner by said wall.

If the actuator head 22 is displaced downward from the closed position into the open position along the movement axis BA, then substantially at the same time the valve opening 19 is opened, the actuator head sealing surface 25 is detached from the inner sealing surface of the valve housing 17, the actuator head auxiliary sealing surface 27 is detached from the inner auxiliary sealing surface of the valve housing 17, and the actuator head ventilation channel 30 is fluidically connected to the valve housing ventilation passage 31. Thereby, in the open position, the decoupling chamber 10 is fluidically connected to the environment.

Figure 2:
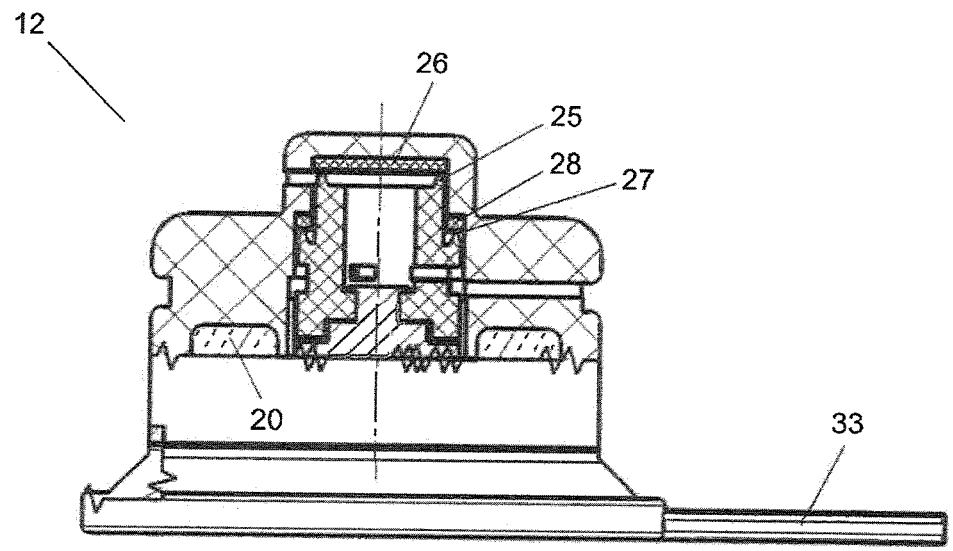
FIG. 2 a switchable valve of a hydraulic mount according to a second embodiment in a cross-sectional representation.
Figure 3:
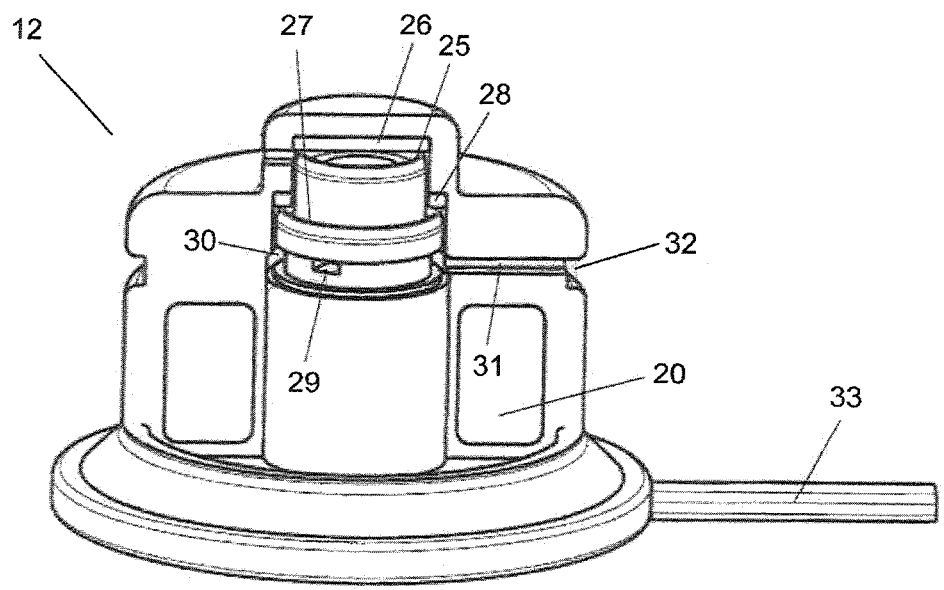
FIG. 3 the switchable valve from FIG. 2 in a perspective representation in partial cross section.

FIG. 2 and FIG. 3 show a switchable valve 12 of a switchable hydraulic mount according to a second embodiment. The cross section in FIG. 2 extends through the central axis of the valve 12. The second embodiment differs from the first embodiment in the configuration of the switchable valve 12. In particular, in the second embodiment, the elastomer sealing material 26, 28 is provided on the valve housing side, in particular on the inner sealing surface and on the inner auxiliary sealing surface of the valve housing 17. Furthermore, both the actuator head sealing surface 25 and also the actuator head auxiliary sealing surface 27 in each case are formed at the top of a section which tapers in closing direction, so that one can here also speak of an actuator head sealing line or actuator head auxiliary sealing line. FIG. 2 and FIG. 3 show the valve 12 in open position. In FIG. 2 and FIG. 3, the control cable 33 for controlling the switchable valve 12 is shown, wherein the control cable 33 is connected at least to the drive coil 20.

Figure 4:
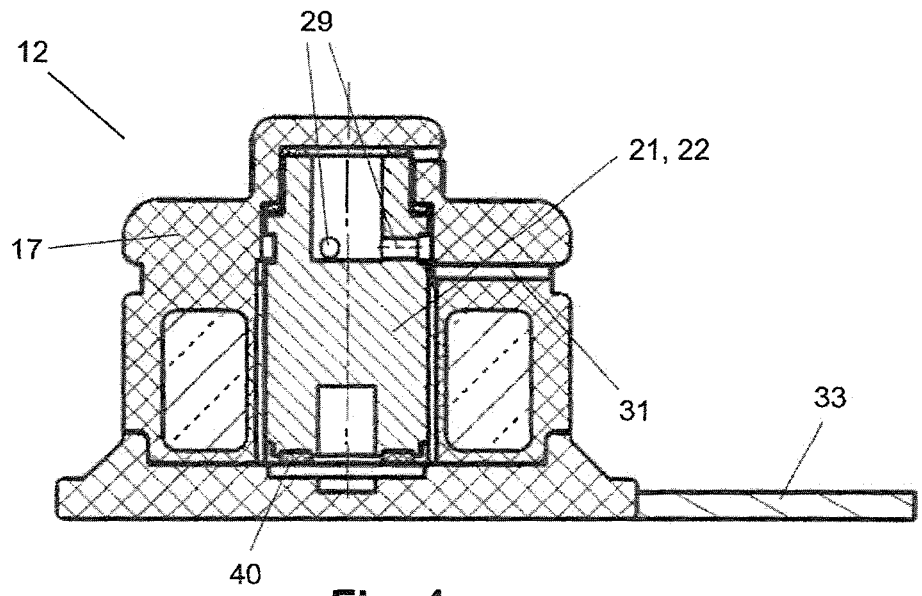
FIG. 4 a switchable valve of a hydraulic mount according to a third embodiment in a cross-sectional representation.
Figure 5:
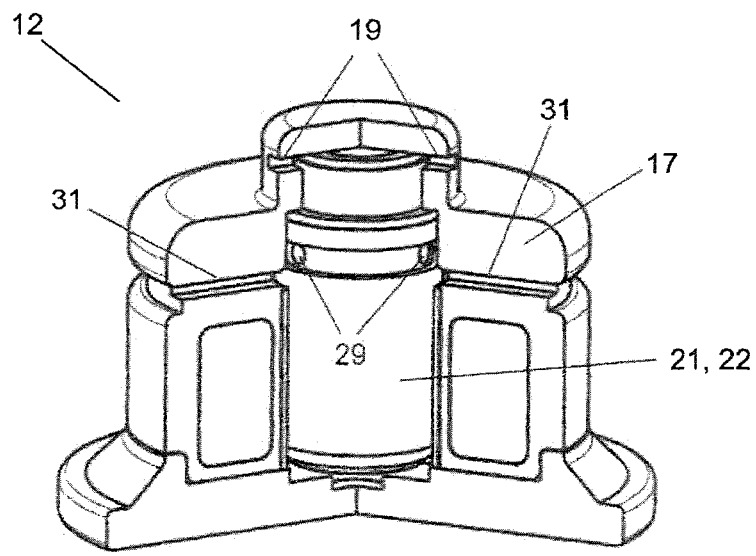
FIG. 5 the switchable valve from FIG. 4 in a perspective representation in partial cross section.

FIG. 4 and FIG. 5 show a switchable valve 12 of a switchable hydraulic mount according to a third embodiment. The cross section in FIG. 4 extends through the central axis of the valve 12. The third embodiment differs from the first and second embodiments in that the actuator head 22 and the armature 21 are formed as a single piece. Furthermore, the actuator head ventilation passage 29 according to the third embodiment is designed to be circular in cross section and not rectangular as in the preceding embodiments. A total of three actuator head ventilation passages 29 are formed at equal angular distances extending radially in the actuator head 22. Correspondingly, three valve housing ventilation passages 31 are formed at equal angular distances extending radially in the valve housing 17. The valve housing 17 furthermore comprises three valve openings 19 which are formed at equal angular distances extending radially in the valve housing 17. On the lower side of the actuator head 22 or of the armature 21, a damping ring 40 made of elastomer material is arranged, in order to reduce impact noises during the opening of the valve.

Figure 6:
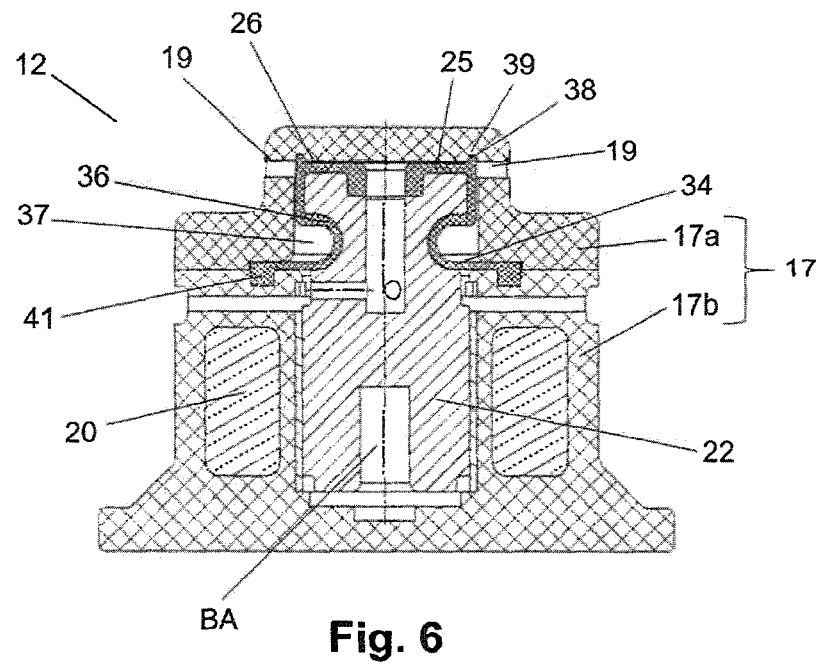
FIG. 6 a switchable valve of a hydraulic mount according to a fourth embodiment in a cross-sectional representation, in closed position.
Figure 7:
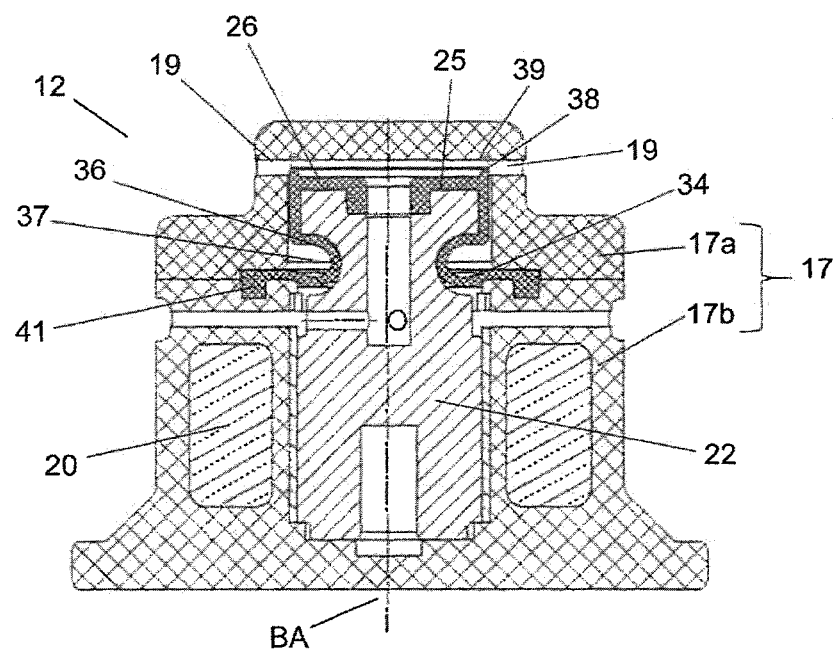
FIG. 7 the switchable valve from FIG. 6 in a cross-sectional representation, in open position.

FIG. 6 shows a switchable valve 12 of a switchable hydraulic mount according to a fourth embodiment in the closed position, and FIG. 7 shows the switchable valve 12 of the fourth embodiment in the open position. The cross sections in FIGS. 6 and 7 extend through the central axis of the valve 12. In the fourth embodiment, the actuator head 22 comprises no actuator head auxiliary sealing surface which in closed position is in contact with an inner auxiliary sealing surface in order to form the auxiliary seal. In the fourth embodiment, the sealing material 26 of the actuator head sealing surface 25 and the auxiliary seal are implemented by means of a single-piece continuous sealing membrane 34 in the form of a rolling membrane. In the area of the actuator head sealing surface 25 and in an upper section of the radial side wall of the actuator head 22, the sealing membrane 34 can also be vulcanized or glued on the actuator head 22, with corresponding configuration of the actuator head 22. A radially outer marginal section of the sealing membrane 34 is clamped or inserted in the valve housing 17. For this purpose, the valve housing 17 comprises two valve housing portions 17a, 17b, which are divided transversely with respect to the movement axis BA and which clamp in the outer marginal section of the sealing membrane 34 which comprises a circumferential bead 41.

The connection area 36 of the sealing membrane 34 with respect to the actuator head 22 is formed as bellows-shaped or in the form of a rolling membrane section. The bellows-shaped section of the sealing membrane 34 is arranged in an annular depression 37 of the actuator head 22 provided for this purpose and, in closed position, it is substantially in full contact with the surface of the annular depression 37, whereby the sealing membrane 34 is satisfactorily supported. The sealing membrane 34 can also be partially vulcanized or glued in the annular depression 37 in an upper section thereof on the actuator head 22. During the displacement from the closed position into the open position, the bellows-shaped section is lifted, at least partially rolling off, from the surface of the depression 37.

The section of the sealing membrane 34 on the actuator head sealing surface 25, that is to say the elastomer sealing material 26 of the actuator head sealing surface 25, comprises, on its radial margin, a circumferential sealing lip 38 protruding axially in closing direction, which, in closed position, engages in or protrudes into a circumferential sealing groove 39, wherein the sealing groove 39 is formed in the inner sealing surface of the valve housing 17. Sealing lip 38 and sealing groove 39 are formed in such a manner that, due to the pressure applied in the valve openings 19, the sealing lip 38 is pressed against the inner surface of the sealing groove 39, whereby the sealing action is increased. The valve 12 of the fourth embodiment comprises four valve openings which are formed at equal angular distances in the valve housing 17.

The switchable valve 12, in particular the valve housing 17, the actuator head 22 with the annular depression 37 and the sealing membrane 34 are preferably configured in such a manner that a resulting force of the pressure which is applied against the actuator head 22 in the closed position acts in closing direction. For this purpose, the diameter of the actuator head accommodation of the valve housing 17 can be designed to be smaller below the sealing membrane 34 than above the sealing membrane 34. Alternatively or additionally, for this purpose, the diameter of the actuator head 22 can be designed to be smaller under the annular depression 37 than above the annular depression 37 in the area of the actuator head sealing surface 25.

As a result of the fact that, in the closed position, due to the applied pressure, a force acts on the actuator head 22 in closing direction, the actuation force necessary for bringing the actuator head 22 into the closed position and keeping it in the closed position can advantageously be reduced further. Thus, an additional pressure reduction or a pressure compensation has also been achieved. This enables the use of even smaller, more economical linear actuators and further reduces the closing and opening noises. It should be noted that the linear actuator can comprise a spring element (not shown) which presses the actuator head 22 in closing direction, wherein, when the drive coil 20 is actuated, the actuator head 22 is moved against the spring force into the open position and held in the open position. However, a reversed configuration is also possible. Thus, the fourth embodiment enables the use of a spring element with an even lower stiffness as well as the use of a drive coil-armature combination with an even lower efficiency, in order to bring the switchable valve 12 during operation into the closed position or open position and keep it in the closed position or open position.

Figure 8:
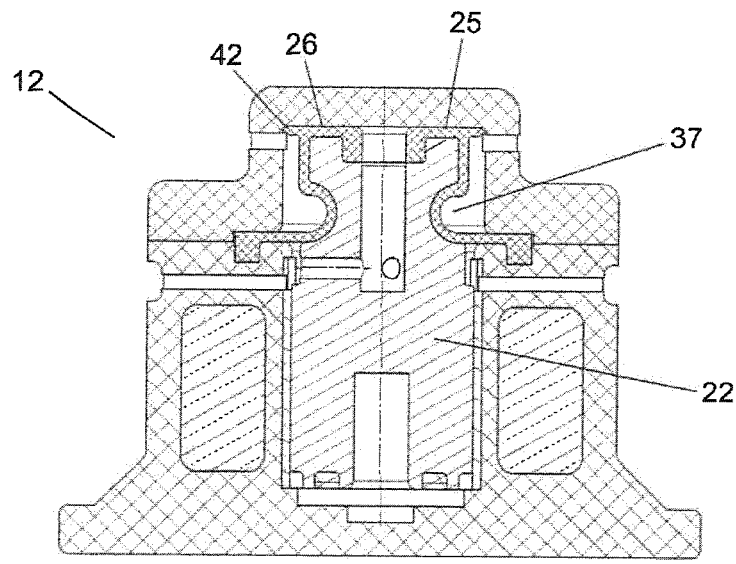
FIG. 8 a switchable valve of a hydraulic mount according to a fifth embodiment in a cross-sectional representation, in closed position.

FIG. 8 shows a switchable valve 12 of a switchable hydraulic mount according to a fifth embodiment in the closed position, wherein the cross section in FIG. 8 extends through the central axis of the valve 12. The fifth embodiment represents a variation of the fourth embodiment. In the fifth embodiment, the section of the actuator head 22 above the annular depression 37 is designed first to have a smaller diameter than the lower section of the actuator head 22 under the annular depression 37. However, on the actuator head sealing surface 25, the sealing material 26 of the actuator head 22 comprises a circumferential, radially protruding sealing flange 42, so that the actuator head 22 in the area of the actuator head sealing surface 25 is designed to have a larger diameter than the lower section of the actuator head 22 under the annular depression 37, whereby the pressure reduction or pressure compensation is achieved.

Figure 9:
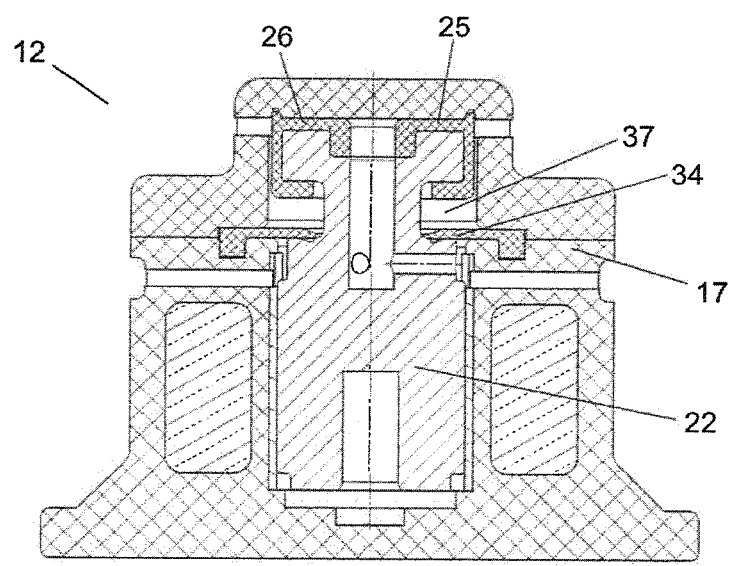
FIG. 9 a switchable valve of a hydraulic mount according to a sixth embodiment in a cross-sectional representation, in closed position.

FIG. 9 shows a switchable valve 12 of a switchable hydraulic mount according to a sixth embodiment in the closed position, wherein the cross section in FIG. 9 extends through the central axis of the valve 12. The sixth embodiment is also a variation of the fourth embodiment. In the sixth embodiment, the annular depression 37 of the actuator head 22 is formed to have a substantially rectangular or square cross section. The section of the actuator head 22 above the annular depression 37 up to the actuator head sealing surface 25 is designed to have a larger diameter than the section of the actuator head 22 under the annular depression 37. Furthermore, the inner diameter of the valve housing 17, that is to say the diameter of the actuator head accommodation of the valve housing, is designed to be smaller under the sealing membrane 34 than above the sealing membrane 34. Due to this configuration, the pressure reduction or pressure compensation is achieved. In the sixth embodiment, the sealing material 26 of the actuator head 22 and the sealing membrane 34 are formed separately from one another. The sealing membrane 34 can be vulcanized on a radial inner margin thereof on the actuator head 22 or glued to said actuator head, in particular on the lower axial inner surface of the annular depression 37.

LIST OF REFERENCE NUMERALS

1 Switchable hydraulic mount
2 Spring body
3 First fluid chamber
4 Bellows
5 Second fluid chamber
6 Installation connection
7 Separation plate
7a, 7b Plate portions
8 Decoupling membrane (decoupling element)
9 Fluid channel
10 Decoupling chamber
11 Ventilation channel
12 Switchable valve
13 Lower mount housing
14 Valve accommodation
15 Upper mount housing
16 Flanging
17 Valve housing
17a, 17b Valve housing portion
18 O-ring
19 Valve opening
20 Drive coil
21 Armature
22 Actuator head
23 Cavity
24 Actuator head opening
25 Actuator head sealing surface
26 Sealing material
27 Actuator head auxiliary sealing surface
28 Sealing material
29 Actuator head ventilation passage
30 Actuator head ventilation channel
31 Valve housing ventilation passage
32 Valve housing ventilation channel
33 Control cable
34 Sealing membrane
36 Connection area
37 Annular depression
38 Sealing lip
39 Sealing groove
40 Damping ring
41 Circumferential bead
42 Sealing flange
BA Movement axis

What is claimed is:

1. A switchable hydraulic mount, comprising:
a first fluid chamber,
a spring body which partially delimits the first fluid chamber,
a second fluid chamber,
at least one fluid channel which fluidically connects the second fluid chamber to the first fluid chamber, so that, during compression and rebound of the spring body, a damping fluid can flow between the first fluid chamber and the second fluid chamber,
a decoupling chamber,
a decoupling element for decoupling the first fluid chamber and the second fluid chamber, wherein the decoupling element is arranged between the first fluid chamber and the decoupling chamber, and said first fluid chamber and the decoupling chamber are separated from one another, and
a switchable valve which is adapted to selectively open or close the decoupling chamber with respect to ambient atmosphere, in order to vary a decoupling action of the decoupling element,
wherein the switchable valve comprises a valve housing with a linear actuator arranged therein,
wherein the linear actuator comprises an actuator head which can be displaced in the valve housing between a closed position and an open position,
wherein the valve housing comprises at least one valve opening located between the decoupling chamber and the actuator head and which, in the open position, connects the decoupling chamber to the environment ambient atmosphere and which, in the closed position, is closed by the actuator head, and
wherein the valve opening extends transversely with respect to a movement axis of the actuator head.

2. The switchable hydraulic mount according to claim 1, wherein the valve opening extends at least in sections substantially transversely with respect to the movement axis of the actuator head.

3. A switchable hydraulic mount, comprising:
a first fluid chamber,
a spring body which partially delimits the first fluid chamber,
a second fluid chamber,
at least one fluid channel which fluidically connects the second fluid chamber to the first fluid chamber, so that, during compression and rebound of the spring body, a damping fluid can flow between the first fluid chamber and the second fluid chamber,
a decoupling chamber,
a decoupling element for decoupling the first fluid chamber and the second fluid chamber, wherein the decoupling element is arranged between the first fluid chamber and the decoupling chamber, and said first fluid chamber and the decoupling chamber are separated from one another, and
a switchable valve which is adapted to selectively open or close the decoupling chamber with respect to ambient atmosphere, in order to vary a decoupling action of the decoupling element,
wherein the switchable valve comprises a valve housing with a linear actuator arranged therein,
wherein the linear actuator comprises an actuator head which can be displaced in the valve housing between a closed position and an open position,
wherein the valve housing comprises at least one valve opening which, in the open position, connects the decoupling chamber to the ambient atmosphere and which, in the closed position, is closed by the actuator head, and wherein the valve opening extends transversely with respect to a movement axis of the actuator head,
wherein the actuator head internally comprises a cavity which is connected, at least in the open position, to the ambient atmosphere, and
wherein an axial end face of the actuator head comprises an actuator head opening of the cavity, and a circumferential marginal section thereof forms an actuator head sealing surface which is in contact, in the closed position, with an inner sealing surface of the valve housing.

4. The switchable hydraulic mount according to claim 3, wherein the switchable valve moreover comprises an auxiliary seal which, at least in the closed position, seals a gap between a radial outer wall of the actuator head and a radial inner wall of the valve housing with respect to the ambient atmosphere.

5. The switchable hydraulic mount according to claim 4, wherein the auxiliary seal comprises an actuator head auxiliary sealing surface which is formed radially protruding and circumferentially on the actuator head, and an inner auxiliary sealing surface which is formed in the valve housing, wherein the actuator head auxiliary sealing surface is arranged set back with respect to the actuator head sealing surface, and the inner auxiliary sealing surface is arranged set back with respect to the inner sealing surface, and wherein, in the closed position, the actuator head auxiliary sealing surface is in contact with the inner auxiliary sealing surface.

6. The switchable hydraulic mount according to claim 4, wherein the auxiliary seal comprises a sealing membrane which is connected both to the valve housing and also to the actuator head and which extends at least in sections in a radial direction from the actuator head to the valve housing.

7. The switchable hydraulic mount according to claim 6, wherein the sealing membrane includes a connection area which, with respect to the actuator head, is bellows-shaped.

8. The switchable hydraulic mount according to claim 6, wherein the valve housing is formed in multiple valve housing portions, and the sealing membrane is inserted between the valve housing portions in order to connect the sealing membrane to the valve housing.

9. The switchable hydraulic mount according to claim 3, wherein one of the following includes an elastomer sealing material:

the actuator head sealing surface, the inner sealing surface of the valve housing, or both the actuator head sealing surface and the inner sealing surface of the valve housing.

10. The switchable hydraulic mount according to claim 9, wherein one of the following applies:

(a) the sealing material of the actuator head sealing surface comprises an axially protruding, circumferential sealing lip, and the inner sealing surface of the valve housing comprises a circumferential sealing groove in which the sealing lip of the actuator head engages in the closed position, (b) the sealing material of the inner sealing surface of the valve housing comprises an axially protruding, circumferential sealing lip, and the actuator head sealing surface comprises a circumferential sealing groove in which the sealing lip of the valve housing engages in the closed position, or (c) both (a) and (b).

11. The switchable hydraulic mount according to claim 9, wherein the sealing material of the actuator head sealing surface comprises a circumferential, radially protruding sealing flange which, in the closed position, is in contact with the inner sealing surface of the valve housing.

* * * * *